May 29, 1956 — R. W. AYLING — 2,747,386
FLEXIBLE COUPLING
Filed Oct. 19, 1953
2 Sheets-Sheet 1
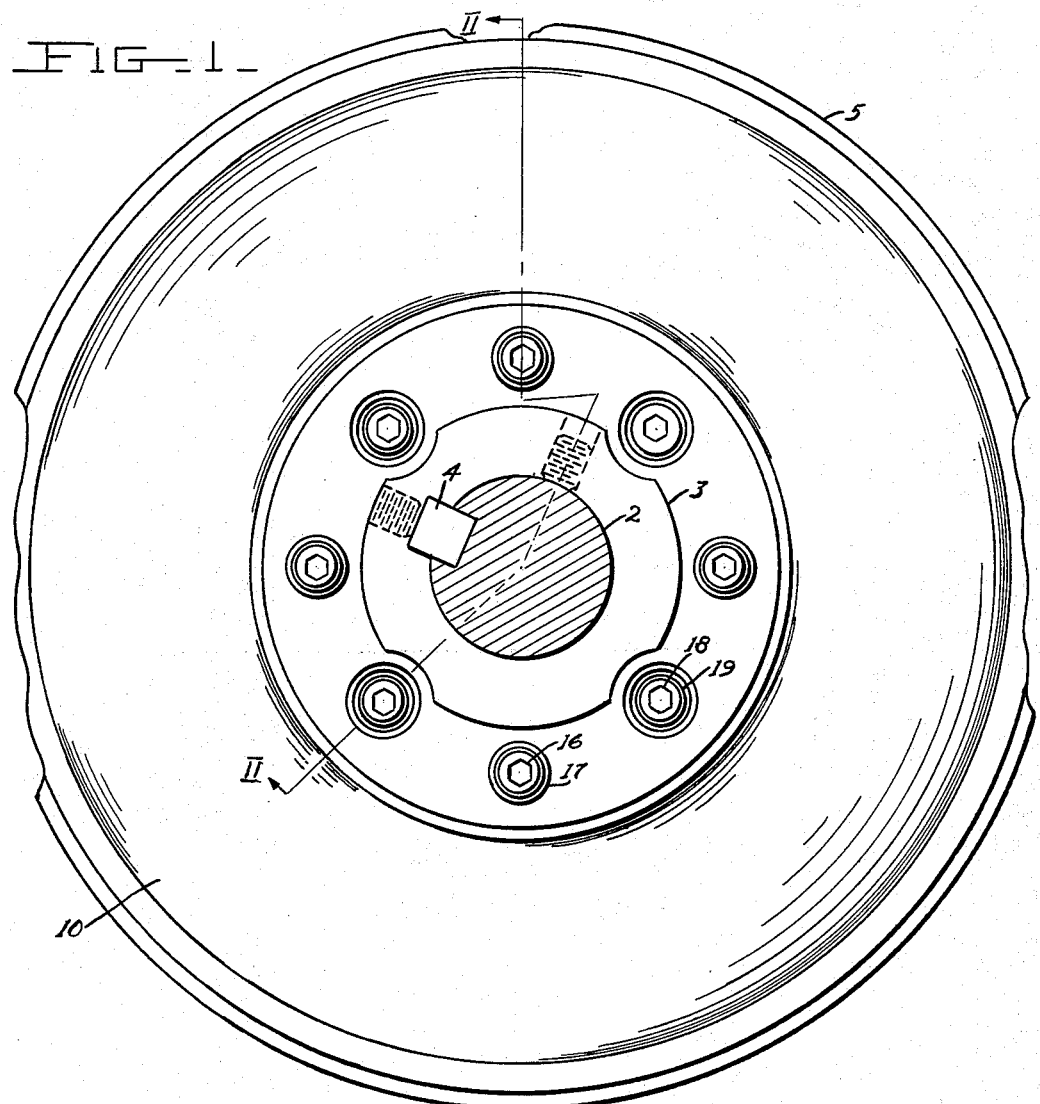
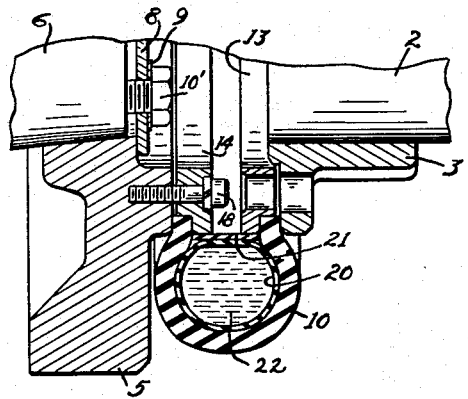
INVENTOR.
Robert W. Ayling
BY Herman Seid
Atty.

United States Patent Office 2,747,386
Patented May 29, 1956

2,747,386

FLEXIBLE COUPLING

Robert W. Ayling, Syracuse, N. Y., assignor to Carrier Corporation, Syracuse, N. Y., a corporation of Delaware Application October 19, 1953, Serial No. 386,800

3 Claims. (Cl. 64—11)

This invention relates to flexible couplings and, more particularly, to a flexible coupling for connecting the shafts of a driving member and a driven member to transmit forces of rotation from one to the other in such manner as to accommodate reasonable angular and parallel shaft misalignment and shaft end motion while permitting torque fluctuations without damage and reducing the magnitude of such fluctuations.

The chief object of the present invention is to provide a simple and inexpensive coupling to transmit torque between adjacent pieces of machinery.

An object of the present invention is to provide a flexible coupling capable of handling torque fluctuations without damage while tending to reduce the magnitude of the fluctuations.

A further object is to provide a flexible coupling capable of accommodating reasonable angular and parallel shaft misalignment. Other objects of the invention will be readily perceived from the following description.

This invention relates to a flexible coupling which comprises, in combination, a flexible, hollow annular member having spaced inner edges, a clamping ring to clamp one edge against a member to be driven, means to secure the ring in clamping position, a second clamping ring to clamp the opposite edge against a driving member, and means securing the second ring in clamping position.

The attached drawing illustrates a preferred embodiment of the invention, in which Figure 1 is a view in elevation of the flexible coupling of the present invention in use;

Figure 3 is a sectional view similar to Figure 2 of a modification of the invention.

Figure 2:
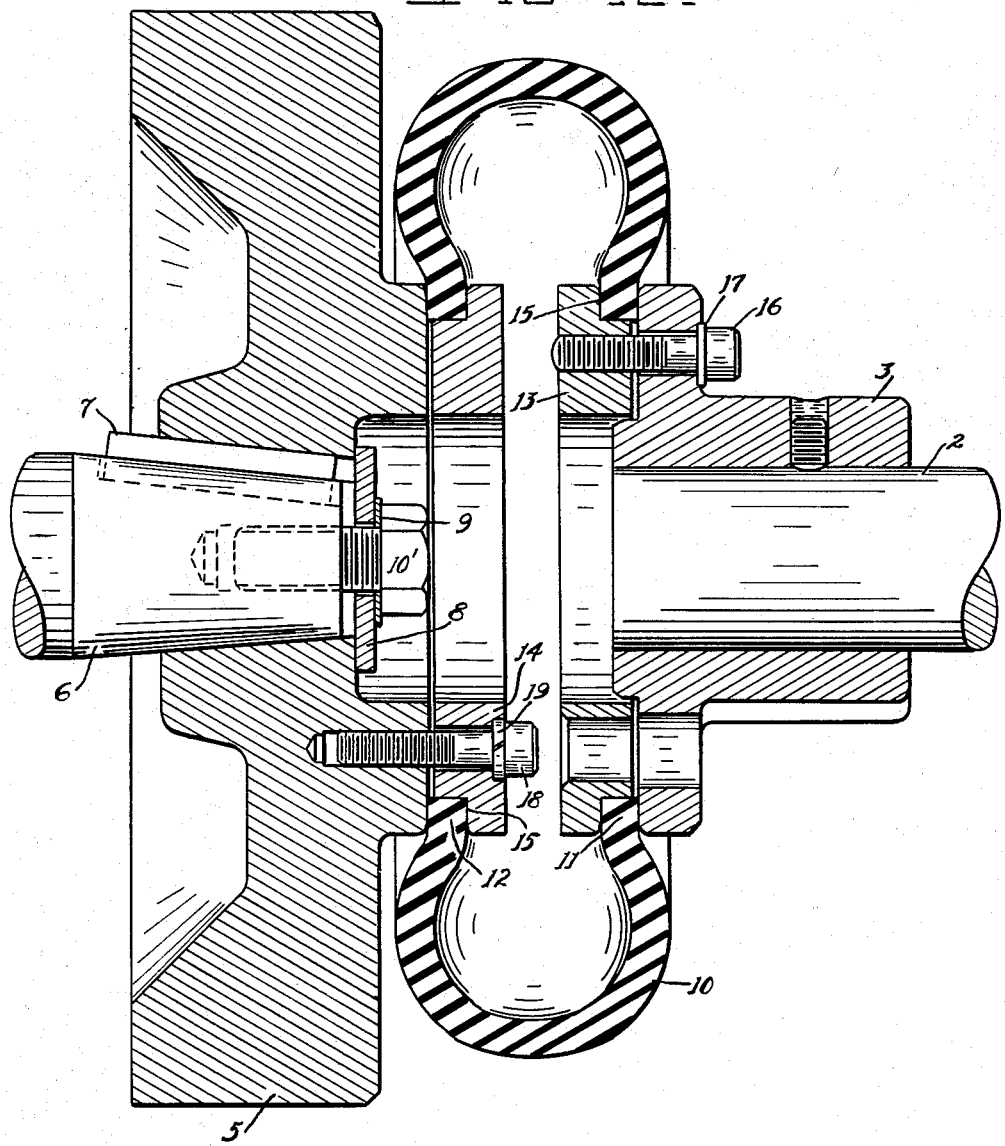
Figure 2 is a sectional view taken in the line II—II of Figure 1.

Referring to the attached drawing, there is shown the flexible coupling of the present invention in use, coupling together the shafts of adjacent pieces of machinery so that forces of rotation may be transmitted from one to the other. There is shown the shaft 2 of a driving member having a hub 3 attached thereto by a drive key 4. A flywheel or hub 5 is attached to the shaft 6 of the member to be driven by drive key 7 and is held securely in place by means of a plate washer 8, a lock washer 9 and a capscrew 10'.

Interposed between the flywheel 5 and the hub 3 is a flexible, resilient, hollow annular member 10. Preferably, the inner edges of the member 10 are provided with spaced beads or flanges 11, 12. If desired, member 10 may be U-shaped in cross-section, in which case the flanges may be omitted, the inner edges then performing the same function performed by the flanges, as hereinafter explained.

Preferably, member 10 is formed of any suitable flexible, resilient material such as rubber, synthetic rubber, etc. I have found that a synthetic rubber tire casing, such as an industrial tire casing, is highly satisfactory in use. Member 10 provides the coupling with flexibility, permitting reasonable angular or parallel shaft misalignment in use.

Clamping rings 13, 14 are provided to clamp member 10 to the flywheel and the hub. Each ring is provided with a circumferential shoulder 15 which forms a seat for the flanges 11, 12. Capscrews 16 and lock washers 17 are employed to attach ring 13 to hub 3. Capscrews 18 and lock washers 19 are employed to attach ring 14 to flywheel 5.

In use, flange 11 of member 10 is seated on shoulder 15 of ring 13 and is clamped or compressed between the wall of the shoulder and the wall of the hub to secure member 10 to the hub. Likewise, flange 12 is seated on shoulder 15 of ring 14 and is compressed or clamped between the wall of the shoulder and the wall of the flywheel to secure member 10 to the flywheel. Thus, member 10 is held in position to transmit forces of rotation from the driving member to the driven member.

In Figure 3, I have illustrated a modification of the invention. In this embodiment, an annular tube 20 is placed within hollow member 10. If desired, a flexible liner 21 may be placed between the inner edge of the tube and the edges of the clamping rings 13, 14 to prevent abrasion of the tube during use. The tube is filled to about 90% capacity with a viscous liquid 22 having as high a unit weight as possible. In use, the liquid rotates with the tube in member 10 at constant speed; however, if fluctuating speeds are encountered, the inertia and frictional drag of the liquid tends to reduce the amplitude of the speed and hence torque variations. In effect, the tube and liquid provide a "kinetic" flywheel.

The present invention provides a simple, inexpensive, flexible coupling capable of accommodating angular and parallel misalignment of the shafts of the driving and driven machinery. The coupling so provided handles torque fluctuations without damage and tends to reduce the magnitude of such fluctuations if they occur. The simple construction permits rapid removal of the coupling if desired to permit work on the driven machinery, such as seal replacements, etc. without disturbing the adjacent machines or the driven hub. Shaft end motion is readily accommodated by the flexible coupling, the coupling providing torque fluctuation damping.

The coupling is non-conducting and does not transmit noise from one piece of the coupled machinery to the other.

While I have described a preferred embodiment of the invention, it will be understood the invention is not limited thereto since it may be otherwise embodied within the scope of the following claims.

I claim:

1. In a flexible coupling adapted to transmit forces of rotation from the shaft of a driving member to the shaft of a driven member, the combination of a flexible, hollow annular member, having its inner portion terminating in spaced flanges, a clamping ring to clamp one flange against a member to be driven, means securing the ring in clamping position, a second clamping ring clamping the opposite flange against a driving member, means securing the second ring in clamping position, and a tube within the hollow member, said tube being partially filled with a viscous fluid.

2. In combination, a flywheel attached to the shaft of a member to be driven, a hub attached to the shaft of a driving member, a flexible, hollow annular member interposed between the flywheel and the hub, said hollow member having its inner portion terminating in spaced flanges, a clamping ring having a circumferential shoulder for clamping a flange of the hollow member against a wall of the flywheel, a second clamping ring having a circumferential shoulder for clamping the second flange of the annular member against a wall of the hub, said shoulders serving as seats for the flange portions of the annular member, means for attaching the clamping rings to the respective flywheel and hub members, and a tube assembled within the hollow annular member, said tube being partially filled with a viscous liquid.

3. The combination comprising a driven shaft; a driving shaft; means connecting the two shafts including a flexible hollow annular member having spaced edges, a first clamping element for detachably securing one edge of the annular member to a portion of the driving shaft, a second clamping element for detachably securing the other edge of the annular member to a portion of the driven shaft; and means including a body of viscous liquid confined in said flexible hollow annular member for reducing the amplitude of variations in torque as they are transmitted from the driving shaft to the driven shaft.

References Cited in the file of this patent

UNITED STATES PATENTS

| | | |
|---|---|---|
| 1,107,315 | Krebs | Aug. 18, 1914 |
| 1,631,433 | Simms | June 7, 1927 |
| 2,648,958 | Schlotmann | Aug. 18, 1953 |

FOREIGN PATENTS

| | | |
|---|---|---|
| 660,305 | Germany | May 23, 1938 |